United States Patent
Temizel et al.

(10) Patent No.: US 7,245,769 B2
(45) Date of Patent: Jul. 17, 2007

(54) ARCHIVAL OF TRANSFORMED AND COMPRESSED DATA

(75) Inventors: Alptekin Temizel, Guildford (GB); Mehmet Bilgay Akhan, Egham Surrey (GB); Anil Aksay, Guildford (GB)

(73) Assignee: Visioprime (GB)

( * ) Notice: Subject to any disclaimer, the term of this patent is extended or adjusted under 35 U.S.C. 154(b) by 823 days.

(21) Appl. No.: 10/354,316

(22) Filed: Jan. 29, 2003

(65) Prior Publication Data

US 2003/0152278 A1 Aug. 14, 2003

(51) Int. Cl.
G06K 9/36 (2006.01)
G06K 9/46 (2006.01)

(52) U.S. Cl. ............... 382/233; 382/239; 382/240; 382/248

(58) Field of Classification Search ............... 382/233, 382/239, 240, 244, 245, 246, 248
See application file for complete search history.

(56) References Cited

U.S. PATENT DOCUMENTS

| | | | |
|---|---|---|---|
| 5,321,776 A | 6/1994 | Shapiro | |
| 6,002,794 A | 12/1999 | Bonneau et al. | |
| 6,058,215 A * | 5/2000 | Schwartz et al. | 382/244 |
| 6,233,359 B1 | 5/2001 | Ratnakar et al. | |
| 6,985,632 B2 * | 1/2006 | Sato et al. | 382/240 |
| 7,039,250 B2 * | 5/2006 | Kuroiwa | 382/248 |

FOREIGN PATENT DOCUMENTS

WO WO0021300 4/2000

OTHER PUBLICATIONS

V. Bhaskaran, Mediaprocessingn in the Compressed Domain, *Proceedings of COMPCON '96*, pp. 204-209 IEEE.

* cited by examiner

*Primary Examiner*—Phuoc Tran
(74) *Attorney, Agent, or Firm*—Sawyer Law Group LLP

(57) ABSTRACT

The invention of the present application provides data compression and archival features for data that has previously been transformed and compressed. In a first aspect of the present invention, compressed data that has previously been transformed and compressed is received, and coefficients in the compressed data are selected and discarded to reduce the amount of storage space required by the compressed data. In another aspect, the compressed data has previously been sub-sampled by a wavelet transform, and wavelet coefficients in the compressed data are selected and discarded. In another aspect, wavelet coefficients in the compressed data are dequantized, wavelet coefficients in the compressed data having less value for the data are selected, and the wavelet coefficients are requantized so as to cause more loss of data for the selected coefficients to reduce the amount of storage space required by the compressed data. In another aspect, groups of wavelet coefficients in unused color components of compressed image data are selected and discarded to reduce the amount of storage space required by the compressed image data.

15 Claims, 8 Drawing Sheets

ARCHIVAL OF TRANSFORMED AND COMPRESSED DATA

FIELD OF THE INVENTION

The present invention relates to techniques for the compression of data, and more particularly to the archival and compression of data that has already been transformed and compressed.

BACKGROUND OF THE INVENTION

One application in the manipulation of data used by computer and electronic devices is the compression and decompression of data. Storage space for data in memory devices is limited in many circumstances, so that data compression techniques are often used to reduce the amount of storage space that is needed for an image, a message, or other block of data. Once compressed and stored, the compressed data is eventually decompressed into its uncompressed, original form using a technique or scheme complementary to the compression technique. Some types of compression are known as lossy, where some data is lost in the compression and decompression process. However, in many applications, such as image compression, the lost data typically does not make a noticeable or practical difference in the final use or application of the data.

Some compression techniques (schemes) are well known. A transformation technique can be utilized to compress data, where the transformation technique helps separate an image (for example) into parts or sub-bands of differing importance, with respect to the image's visual quality. Some examples of well-known transformation techniques include the Discrete Cosine Transform (DCT) and the Discrete Fourier Transform. These types of techniques transform an image or other data from a spatial domain to the frequency domain.

Another transformation technique that has been used for compression is known as wavelet-based compression. In this type of compression, a wavelet transform is used to reduce the amount of data with little noticeable loss. One type of wavelet transform that can be performed using digital processors and circuits is the Discrete Wavelet Transform (DWT), which uses discrete samples of a continuous wavelet, and can be similar to a filtering technique with discrete coefficients. The DWT can be tuned to a particular application or input, allowing it in many cases to be more useful for applications such as image compression or enhancement than other transforms such as the discrete cosine transform (DCT) or averaging filters. For example, the JPEG2000 still image compression standard is wavelet-based. Most digital cameras are expected to move from DCT-based JPEG images to the wavelet-based JPEG2000 standard, since wavelet-based compression can achieve better image quality for a given compressed image size than conventional DCT-based compression methods. Once transformed by DWT and compressed, the compressed data can be decompressed to its original form and storage size using a complementary decompression mechanism and Inverse Discrete Wavelet Transform (IDWT).

In many applications, once images are compressed there is a requirement to compress them further and archive the compressed images. For example, in a digital video recording application, the user may wish to keep recorded images that cover a timespan of 30 days. In many instances, two days of high quality images and 28 days of lower quality images are acceptable. In another example, in the archival and storage of medical records or fingerprints, it is acceptable to keep some old records at a lower quality.

One problem with prior compression techniques is that they are inefficient when it comes to compressing data after the initial compression, e.g. for purposes of archival of data. For example, the prior art requires that to store compressed data at a higher compression ratio, the compressed data must be fully decompressed to its original form and then compressed at the higher ratio. It is a waste of time and processing resources to perform this decompression-compression process, especially when a large quantity of data needs to be archived at the higher compression ratio.

SUMMARY OF INVENTION

The invention of the present application provides data archival features for data that has been transformed and compressed. In a first aspect of the present invention, a method and system for archiving compressed data includes receiving compressed data that has previously been transformed and compressed, selecting coefficients or segments of coefficients in the compressed data for discarding, and discarding the selected coefficients to reduce the amount of storage space required by the compressed data. In a second aspect, a method and system for archiving compressed data includes receiving compressed data that has previously been compressed utilizing a wavelet transform, dequantizing wavelet coefficients in the compressed data, selecting wavelet coefficients in the compressed data having less value for the data than the non-selected wavelet coefficients, and requantizing the wavelet coefficients so as to cause more loss of data for the selected coefficients to reduce the amount of storage space required by the compressed data. In a third aspect, a method for archiving compressed image data includes the steps of receiving the compressed image data that has previously been compressed utilizing a wavelet transform, selecting groups of wavelet coefficients in color components of the compressed image data, and discarding the selected groups of wavelet coefficients to reduce the amount of storage space required by the compressed image data.

The present invention provides several methods and apparatus for compressing and archiving already-compressed data to achieve a yet higher compression ratio. The techniques and systems described allow data to be further compressed without having to fully decompress the data and compress it again. This can save valuable processing resources and makes possible the archival of compressed data in real time environments in which fast processing of data is required.

DETAILED DESCRIPTION OF PREFERRED EMBODIMENTS

The present invention relates to techniques for the compression of data, and more particularly to the archival and compression of data that has already been transformed and compressed. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Several embodiments and examples of the present invention are described below. While particular applications and methods are explained, it should be understood that the present invention can be used in a wide variety of other applications and with other techniques within the scope of the present invention.

The present invention is related to the use of compression with transforms and encoding techniques. One type of transform that the invention is well suited for is the wavelet transform. Wavelet transforms have substantial advantages over conventional Fourier transforms for analyzing nonlinear and non-stationary time series. These transforms are used in a variety of applications, some of which include data smoothing, data compression, and image reconstruction, among many others.

Wavelet transforms such as the Discrete Wavelet Transform (DWT) can process a signal to provide discrete coefficients, and many of these coefficients can be discarded to greatly reduce the amount of information needed to describe the signal. One area that has benefited the most from this particular property of the wavelet transforms is image processing. The DWT can be used to reduce the size of an image without losing much of the quality, i.e. compress image data. For example, for a given image, the DWT of each row can be computed, and all the values in the DWT that are less then a certain threshold can be discarded. Only those DWT coefficients that are above the threshold are saved for each row. When the original image is to be reconstructed, the discarded coefficients are assumed to have zero value and the inverse Discrete Wavelet Transform (IDWT) can be used to reconstruct each row of the original image. Or, the image can be analyzed at different frequency bands, and the original image reconstructed by using only the coefficients that are of a particular band.

The invention also is suitable for use with data that has been decomposed and compressed using other types of transforms, such as the Discrete Cosine Transform (DCT), Fourier transforms, and other transforms.

Figure 1:
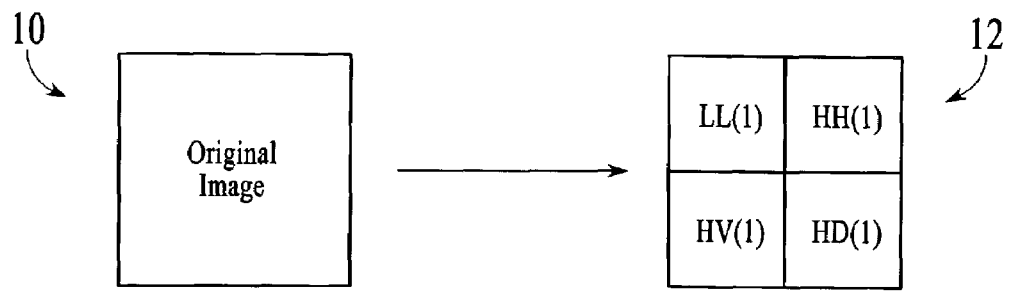
FIG. 1 is a diagrammatic illustration of the transformation of an original image into a one-level wavelet transformed image.

FIG. 1 illustrates a one-level wavelet transformation of an original image 10 as an example of a transformation technique. The result of this process is the wavelet transformed image data 12. Wavelet transforms can decompose an original image into sub-images, each sub-image representing a frequency subset of the original image. Wavelet transforms decomposes the original image successively into high- and low-frequency components, applying the wavelet transform to the low frequency subband. One level of two dimensional wavelet transform creates four sub-sampled separate quarters (also known as "blocks" or "quadrants"), each containing different sets of information about the image. It is conventional to name the top left quarter Low-Low (LL)—containing low frequency horizontal and low frequency vertical information; the top right quarter High-Horizontal (HH)—containing high frequency horizontal information; the bottom left quarter High-Vertical (HV)—containing high frequency vertical information; and the bottom right quarter High-Diagonal (HD)—containing high frequency diagonal information. The level of transform is denoted by a number suffix following the two-letter code. For example, LL(1) refers to the first level of transform and denotes the top left corner of the sub-sampled image 12.

Figure 2:
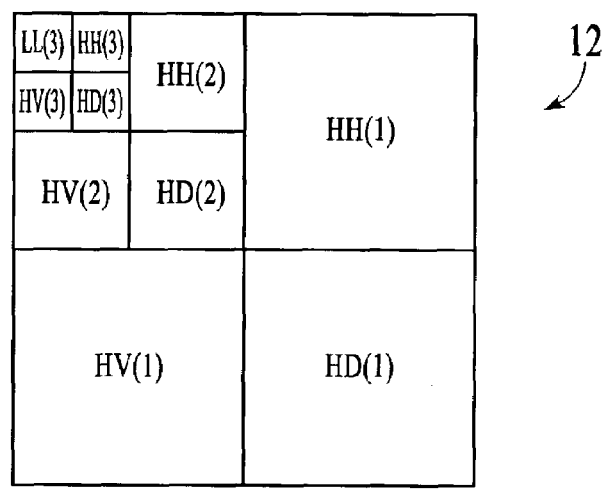
FIG. 2 is a diagrammatic illustration of the transformation of a portion of an original image into three levels using a wavelet transform.

Typically, wavelet transforms are performed for more than one level. FIG. 2 illustrates further transforms that have been performed on the LL quarter of the sub-sampled image 12 to create additional subbands. The second transform performed on the LL(1) quarter produces four second level quarters within the LL(1) quarter which are similar to the first level quarters, where the second level quarters are labeled as LL(2) (not shown), HH(2), HD(2), and HV(2). A third transform performed on the LL(2) quarter produces four third level quarters labeled as LL(3), HH(3), HD(3), and HV(3). Additional transforms can be performed to create sub-sampled images at lower levels.

Other transformation techniques, such as DCT or Fourier transforms, can also be used to seperate image data into different frequency bands.

Figure 3:
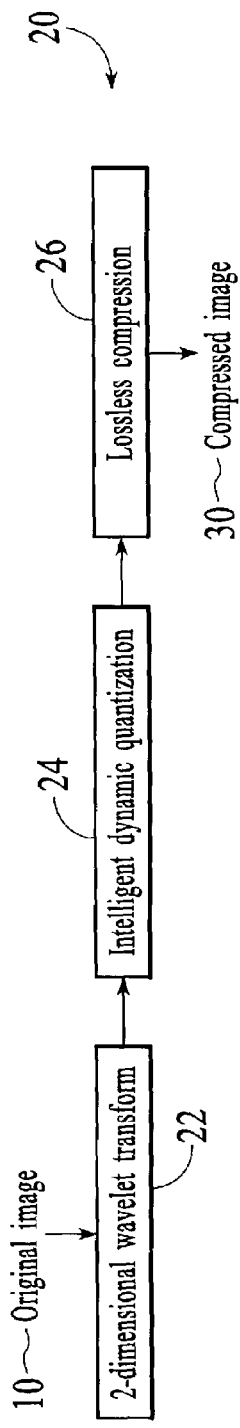
FIG. 3 is a block diagram illustrating a typical wavelet-based compression system for image data.

FIG. 3 is a block diagram 20 illustrating typical functions for performing wavelet-transform-based data compression (e.g., for image data), as an example. The block diagrams and flow diagrams illustrated herein are preferably implemented using software on any suitable general-purpose computer or the like, having microprocessor, memory, and appropriate peripherals, where the software is implemented with program instructions stored on a computer readable medium (memory device, CDROM or DVDROM, magnetic disk, etc.). The block diagrams and flow diagrams can alternatively be implemented using hardware (logic gates, etc.) or a combination of hardware and software.

An original image 10 is input. In the first block 22, a wavelet transformer performs a 2-dimensional wavelet transform on the original image, i.e., in x- and y-directions. Next, a quantizer 24 quantizes the wavelet coefficients. Quantization is a data mapping technique that causes data loss. In quantization, the wavelet coefficients are set to predetermined discrete values and some are zeroed to increase the efficiency of the lossless coding part following the quantization. In one technique that achieves high quality image compression, different quantization factors are used at each quadrant at different levels. Quadrants that are thought to have the maximum impact on visual quality are quantized more accurately than the quadrants that have less visual impact on decompressed image quality. For example, in FIG. 1, LL(1) block has the maximum impact in perceived image quality as it carries the low frequency information, so in the above mentioned quantization scheme, this block would be quantized more accurately. On the other hand, the HD(1) block carries the diagonal edge information (high frequency in horizontal and vertical) and as the human eye is not very sensitive to diagonal edge information, this block is quantized less accurately to achieve higher compression. The output of the quantizer is a compressed form of the original data.

The quantization stage is typically followed by compressor 26, which performs a lossless compression on the data. This lossless compression compresses the data (generally using an entropy coding technique) that has been prepared by the wavelet transform followed by the quantization stage. Some well-known lossless compression techniques or algorithms can be used by the compressor, such as Run Length Encoding (RLE) followed by Huffman Encoding or Arithmetic encoding; or other lossless encoding techniques can be employed. From compressor 26, a compressed image 30 (or "primary" compressed image) is output, which can be stored in less storage space than the original image 10.

Figure 4:
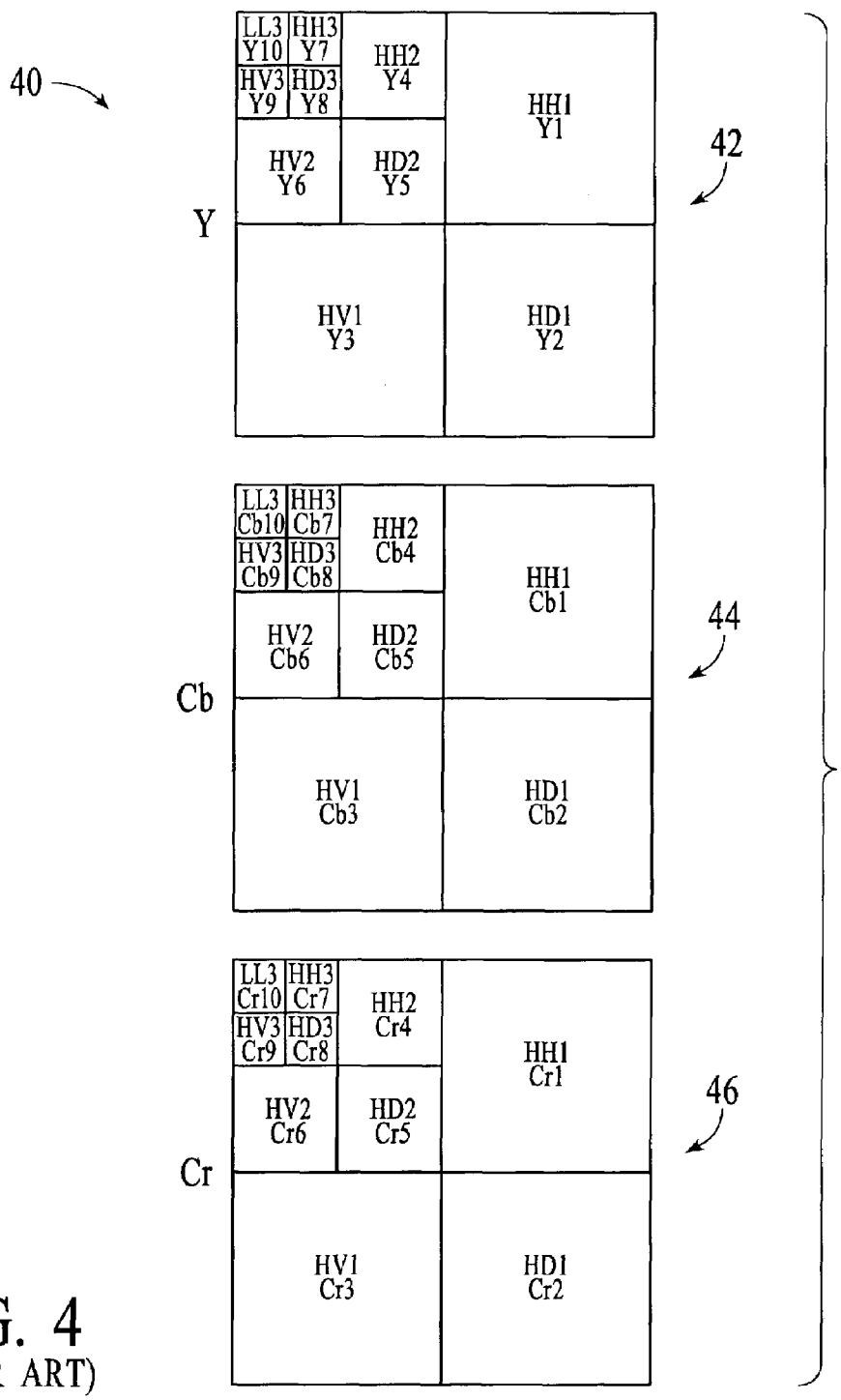
FIG. 4 is a diagrammatic illustration of the wavelet transformation of luminance and color components of an $YC_bC_r$ image.

Each of these operations is carried out on each color component of the image separately. For the present invention, images can be supplied to the compression engine in many color formats, including RGB, YUV, YCbCr, as is well known to those skilled in the art. The color format YCbCr will be used as an example for embodiments described herein, but any suitable color format can be used. FIG. 4 illustrates an example 40 of an output of wavelet transformer block 22 of FIG. 3, in which a 3-level wavelet transform of three standard different color components YCbCr of an image is performed before lossless encoding of the image by compressor 26, where component 42 ("Y") is a luminance component and components 44 and 46 ("Cb" and "Cr") are chrominance components.

Other types of data besides image data can also be transformed and compressed in a similar fashion appropriate to the type of data. Furthermore, other types of transformation techniques, such as DCT, can be followed by the lossless compression similar to that described above.

Figure 5:
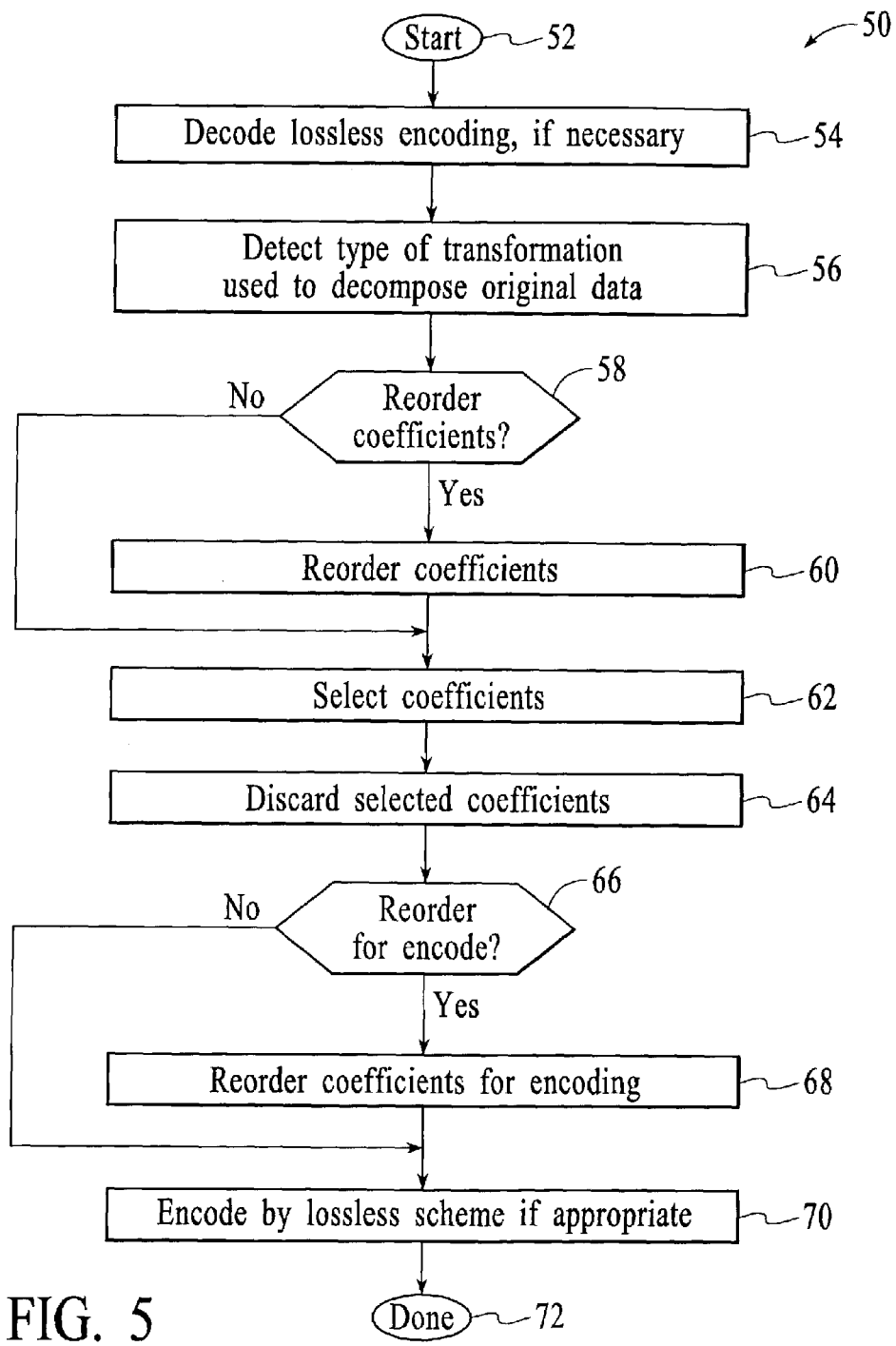
FIG. 5 is a flow diagram illustrating a method of the present invention for further compressing compressed data.

FIG. 5 is a flow diagram illustrating a process flow for a generic archival method 50 of the present invention, which can be used with any of the transformation techniques to compress data. The process begins at 52, and in step 54, the lossless encoding is decoded, if necessary, to allow access to coefficients of the transformation. This step removes the decoding applied by the lossless compressor 26 of FIG. 3 so that the coefficients may be separable and distinguishable in the data. This step may not be necessary if the coefficients or other parts of the compressed data (such as wavelet sub-band block for the wavelet case) can still be distinguished after the lossless compression.

In optional step 56, the process can detect what type of transformation was used to decompose the original data, using the information embedded into the compressed data to enable auto-detection. In other embodiments, only one type of transformation will have been used on the compressed data, and this step can be eliminated.

In step 58, the process checks whether the coefficients are to be reordered. Reordering of coefficients may only be necessary when the original lossless encoding has reordered the coefficients to achieve a higher compression ratio; thus, if the coefficients have not been reordered, the process continues to step 62 from step 58. If the coefficients were reordered in the original lossless encoding, then in step 60 the coefficients are reordered to provide the structure needed to operate on sections of data, such as blocks in wavelet transforms.

In step 62, coefficients in the compressed data (or other structured parts or elements of the compressed data) are selected. The coefficients that are selected are to be discarded in the next step. The coefficients can be selected based on a wide variety of criteria. For example, those coefficients that contribute least to the information content in the original data can be discarded. For image data, those coefficients that have the least significant impact on the image quality can be discarded. Furthermore, groups of coefficients can be discarded based on the transformation technique used (see wavelet examples below). The selection criteria is different for DCT or other transformation techniques than it is for wavelet transformation, but the main idea is to discard the coefficient data having the least impact on image quality which are generally the high frequency coefficients.

In step 64, the selected coefficients are discarded, e.g. the coefficients can be zeroed. This provides a higher compression ratio than the compression ratio of the compressed image 30, making the data suitable for archival.

In step 66, it is checked whether the coefficients need to be reordered, i.e. if the coefficients were reordered in step 60, then they need to be reordered back to the original order needed for the lossless encoding scheme to achieve its higher compression ratio. If such is the case, then in step 68 the coefficients are reordered for the encoding. After step 68, or if the coefficients do not need to be reordered for encoding in step 66, then step 70 is performed, in which the lossless encoding is accomplished, lossless encoding is only done if lossless decoding in step 56 was applied. The same lossless encoding method is used here as was originally used to compress the original image to the compressed image 30 The lossless encoding step 70 provides the secondary compressed data (or "further compressed data") that has a greater compression ratio than the original compressed and data and which can then be archived, if desired. The process is then complete at 72.

Figure 6:
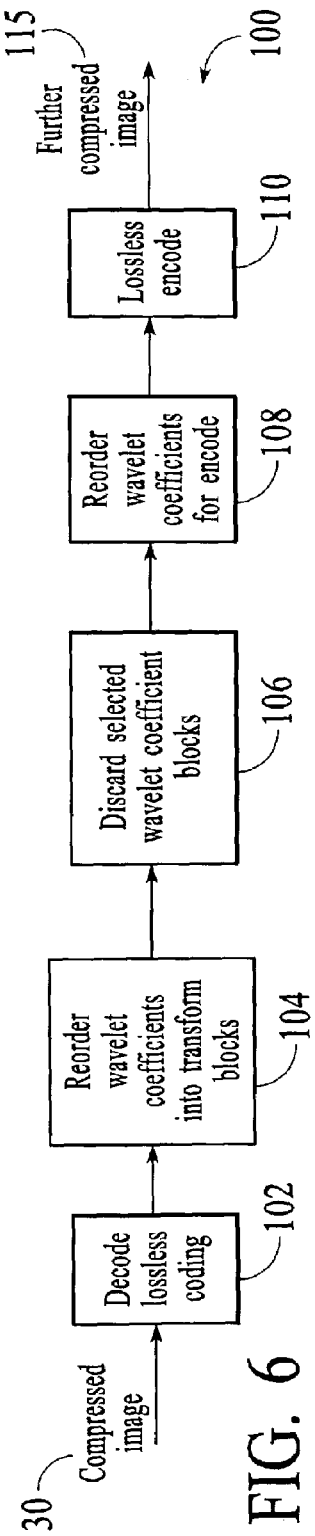
FIG. 6 is a block diagram illustrating a system of the present invention for further compressing wavelet-compressed image data.

FIG. 6 is a block diagram illustrating one embodiment 100 of the functions of an archiver of the present invention for use on wavelet compressed data. Compressed data, such as the compressed image 30 resulting from the wavelet compression process described above with reference to FIG. 3, is input to the archiver. In block 102, the lossless coding in the compressed image is decoded (decompressed) so that the wavelet coefficients can be distinguished in the compressed data (Note that, if wavelet coefficients are already distinguishable this step can be skipped as explained in the next paragraph). In next block 104, the wavelet coefficients are reordered into transform blocks (if necessary). This reordering provides the quadrant structure in conventional wavelet transforms, as shown in FIG. 1. The reordering may not be required if the coefficients are not reordered by the lossless coding.

In block 106, wavelet coefficient blocks are selected and discarded, e.g. the coefficients in the selected blocks are set to zero. Entire coefficient blocks are discarded in this embodiment to achieve a greater compression ratio for the compressed image data. If the compressed image is structured properly, then the individual blocks are easily separable in the compressed image, and individual wavelet blocks can be discarded immediately without requiring any pre-processing. The resulting method is therefore computationally less demanding, since it does not require any pre-processing of the data.

The selection criteria for blocks that are discarded in block 106 can be based on the content in the compressed data that has the maximum impact on resultant image quality. For example, as the human visual system is less sensitive to diagonal edge data, the blocks carrying the diagonal edge information has less effect to overall image quality than the other blocks. Also the blocks carrying finer detail (lower numbered blocks) affects the image quality less than the blocks carrying coarser information (low frequency). Since whole blocks are discarded, this embodiment does not allow the selection of groups of wavelet coefficients within transform blocks that would allow a finer level of control on the resultant image quality and compression; see the description related to FIG. 6, below, for such an embodiment.

In next block 108, the remaining wavelet coefficients are reordered for encoding, and in block 110 the lossless encoding is performed to create a secondary compressed image 115 having a higher compression ratio than the compressed image 30. The same lossless encoding is performed here as was originally done to the original compressed image 30. The secondary compressed image 115 can be archived or stored where desired; it consumes less storage space than the compressed image 30.

Figure 7:
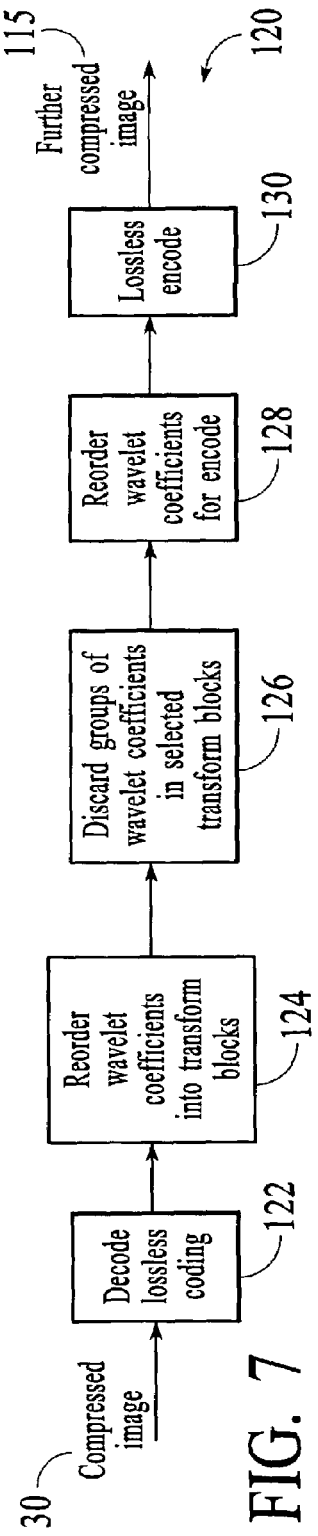
FIG. 7 is a block diagram illustrating a second embodiment of a system of the present invention for further compressing wavelet-compressed image data.

FIG. 7 is a block diagram illustrating another embodiment 120 of an archiver of the present invention in which a more intelligent selection and discarding of coefficients is made. A compressed image 30 is input to the process. In block 122, the lossless coding in the compressed image is decoded so that the wavelet coefficients can be distinguished in the compressed data, allowing access to the wavelet transform blocks. In next block 124, the wavelet coefficients are reordered into wavelet transform blocks. This reordering provides the quadrant structure in conventional wavelet transforms and allows easier selection of groups of wavelet coefficients. This reordering may not be required if the coefficients were not reordered by the lossless coding.

In block 126, groups of wavelet coefficients are discarded from selected transform blocks in the image data. A suitable selection process operates to zero the groups of coefficients. The selection process may use one or more criteria to make the selection. Some examples of these criteria are magnitude of the coefficients, connectivity of significant coefficients (coefficients with higher magnitudes), on which level of transform they are and their effect on SNR (Signal to Noise Ratio) of the reconstructed image. The groups of coefficients are preferably of a size smaller than a whole block or quadrant of coefficients. This embodiment can thus allow a finer level of control on the resultant image quality and compression than the embodiment of FIG. 6, due to the selection and discarding of particular groups of wavelet coefficients, rather than whole blocks. The coefficients are then reordered for encoding in block 128 and lossless encoding is performed on the data in block 130 to create a secondary (further) compressed image 115 having a higher compression ratio than compressed image 30 and which therefore may be stored in less space than the original compressed image 30.

Figure 8:
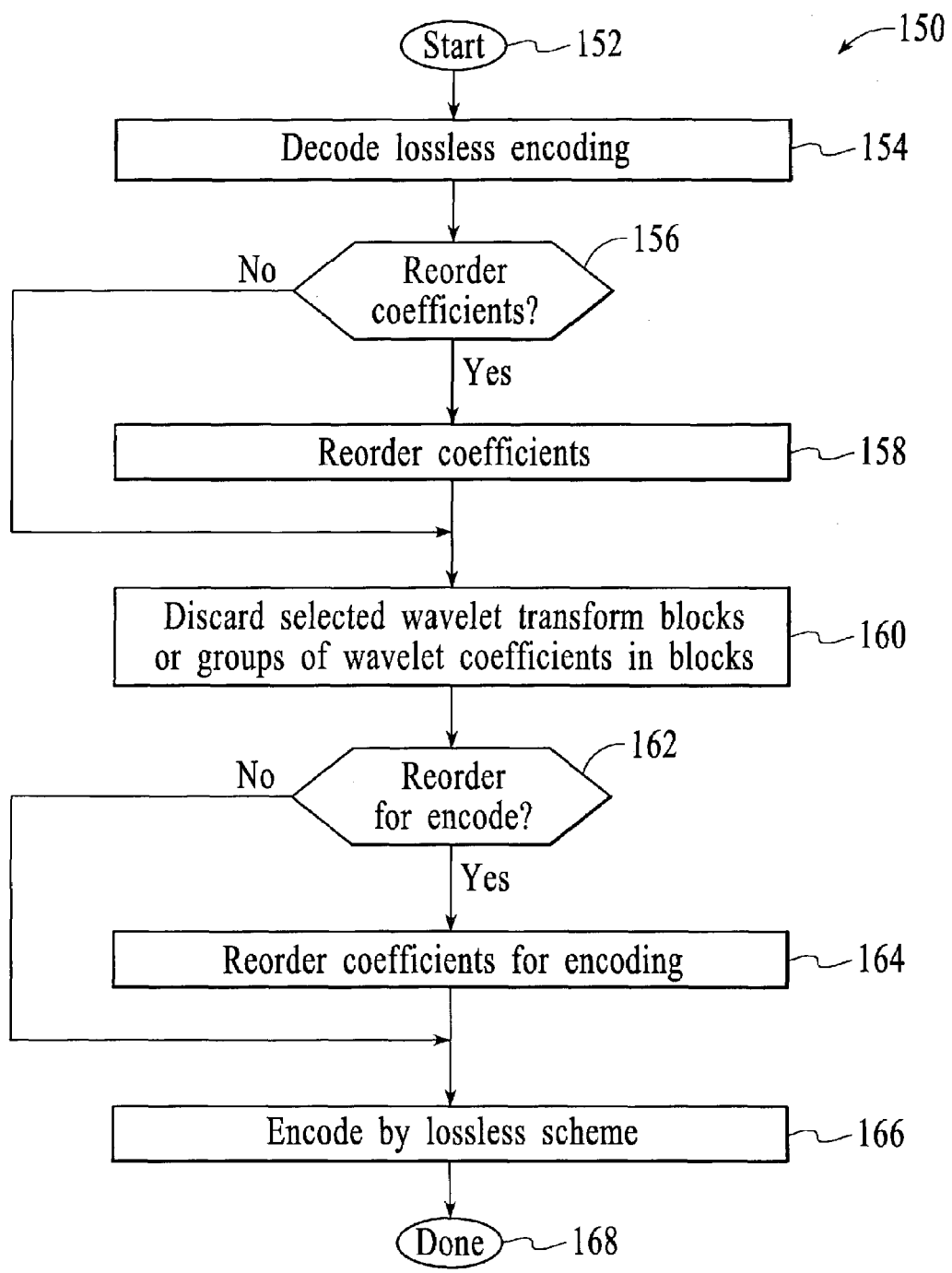
FIG. 8 is a flow diagram illustrating a method of the present invention for further compressing wavelet-compressed image data.

FIG. 8 is a flow diagram illustrating a process flow for an archival method 150 of the present invention for wavelet transformed compressed data. The process begins at 152, and in step 154, the lossless encoding is decoded to allow access to the blocks of wavelet coefficients. In step 156, the process checks whether the coefficients are to be reordered, similar to the processes described above. If the coefficients are not to be reordered, the process continues to step 160 from step 156; otherwise, the coefficients are reordered in step 158 to provide the quadrant structure as in conventional wavelet transforms.

In step 160, the selected wavelet transform blocks, or the selected groups of wavelet coefficients in transform blocks (depending on which embodiment is employed, see FIGS. 5 and 6), are discarded to provide a higher compression ratio than the compression ratio of the compressed image 30. This step is described in greater detail above with respect to the discarding blocks of FIGS. 6 and 7. In step 162, the process checks whether to re-order the coefficients for the encoding step. If such is the case, then in step 164 the coefficients are reordered for the encoding. After step 164, or if the coefficients do not need to be reordered for encoding in step 162, then step 166 is performed, in which the lossless encoding is accomplished. The same lossless encoding method is used here as was originally used to compress the original image to the compressed image 30. The lossless encoding step 166 provides the secondary compressed data that can then be archived, if desired. The process is then complete at 168.

EXAMPLES OF THE INVENTION

Some examples follow to explain the method and system of data archival of the present invention. These examples are only some of many possible examples and should not be construed as limiting the scope of the invention.

When compressing image data, the overall quality of the image that has been compressed is dependent on the chosen technique for discarding coefficients. As explained above for FIG. 7, a technique that allows discarding of selected groups of coefficients can allow for higher compressed image quality than techniques requiring that whole blocks of coefficients be discarded. The level of accuracy of compression or image quality can be based on how much computation resources the user wishes to allocate, the time taken to perform the operations, or other criteria of the user.

In one typical application of a preferred embodiment of the present invention, wavelet compressed image data needs to be compressed further for archival purposes. The compressed image data has been grouped into transformed wavelet quarters, as explained above with respect to FIG. 3. Lossless encoding such as Run Length and Huffman Encoding was performed on each transformed quarter. This type of compression scheme is very suitable for the discarding of wavelet coefficients on a transformed-block basis. Selected quadrants of coefficients can be discarded, thus eliminating the need for any post processing on those discarded quadrants. This is described above with respect to FIG. 6.

The archival technique described above is lossy and causes some further quality degradation in the compressed image. In addition, that technique may not accurately achieve the target secondary compression ratio in some cases, since whole blocks of data are discarded, without the ability to finely adjust the amount of discarded data to obtain the desired compression ratio.

Another alternate technique is to discard the coefficients from the first level of transformation from all three color components and replace the coefficients with zeroes. Referring to FIG. 4, for example, the first level quadrants to be replaced with zeroes would be Y1, Y2, Y3, Cb1, Cb2, Cb3, Cr1, Cr2, and Cr3. These quarters tend to occupy significant space in the compressed data stream. However, most of the data that provides the image features most discernible to a viewer is located in the first (upper left) quadrant, so that the zeroing of the other quadrants does not lead to a significant loss in image quality.

In another, more sophisticated application of the present invention, the compressed data is processed more intelligently in order to achieve a particular compression ratio. Huffman coding, for example, operates on the basis of assigning codes with fewer bits to the most commonly occurring data. For example, in English language data, the letters "T" and "E" are very common, and would therefore be assigned less bits than other letters. Under a technique of the present invention, the primary compressed data is reprocessed with the objective of reducing the number of Huffman code words used. For example, the least common data typically have more bits assigned, so that a greater compression is achieved when the least common data are selected for compression. This technique results in some coefficients being approximated to the nearest neighboring coefficient, or being discarded altogether. Since wavelet transformed coefficients are not discarded in large blocks in this embodiment, the use of this Huffman reduction technique can achieve a target secondary compression ratio more accurately without introducing significant overheads in time or processing resources.

Figure 9:
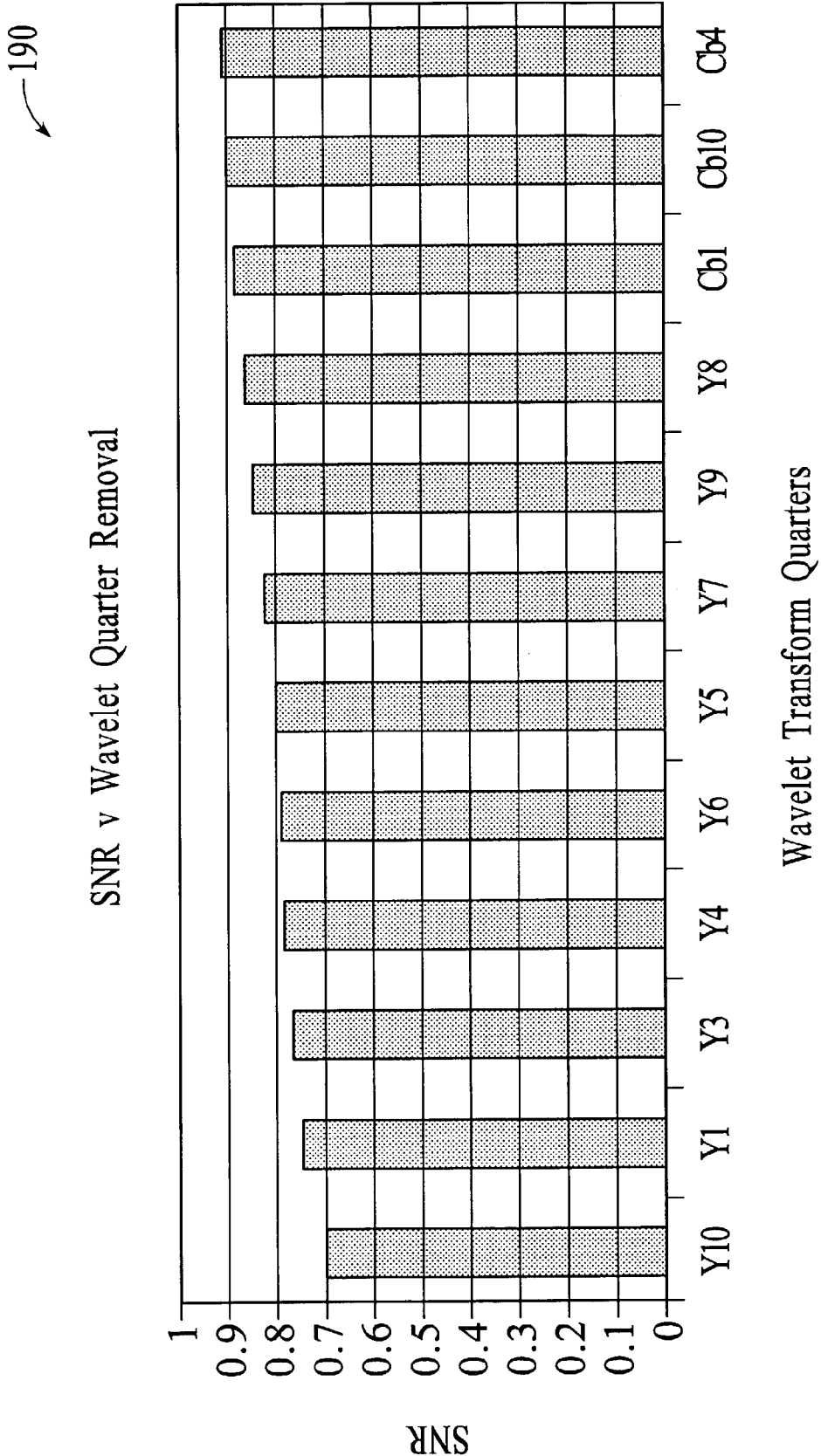
FIG. 9 is a graph illustration of signal to noise ratios for wavelet quarters for use in the compression of the present invention.

In another application for the present invention, wavelet transformed quarters can be selected for discarding (as in FIG. 6) at least partially based on a technique that determines a signal to noise ratio (SNR) in the decompressed image. Signal to noise ratio can be a significant indicator of resultant image quality, where a high signal to noise ratio indicates relatively high quality. FIG. 9 is a bar graph 190 illustrating some signal to noise ratios (SNRs) for different wavelet transform quarters in a transformed image. The results shown by this graph can be used to discard the wavelet quarters that have the least impact on SNR of a decompressed image. For example, as shown in graph 190, the Y10 quarter has the least impact on resulting decompressed image SNR of the shown quarters, and thus is a suitable quarter to discard to minimize degradation of image quality. The remaining data after discard can then be reordered/recompressed (if necessary) and archived.

The SNR technique described above can be applied to each single image, where the quarters of each image are analyzed for signal to noise ratios and discarded as appropriate. However, some applications may require that the compression process of the present invention operate in fast, real-time environment, and the SNR analysis performed for each image may be too time consuming and/or too consuming of processor resources. In such cases, before the process is run in the intended real-time use or application (i.e., "off line"), the SNR technique can determine which range of images are most typically used in the application, and then analyze those images for signal to noise ratios to determine the quarters that have the least signal to noise ratio. These quarters are then the predetermined, selected quarters to be discarded for all images during the real time application, permitting fast, real-time operation of the SNR archival technique.

Figure 10:
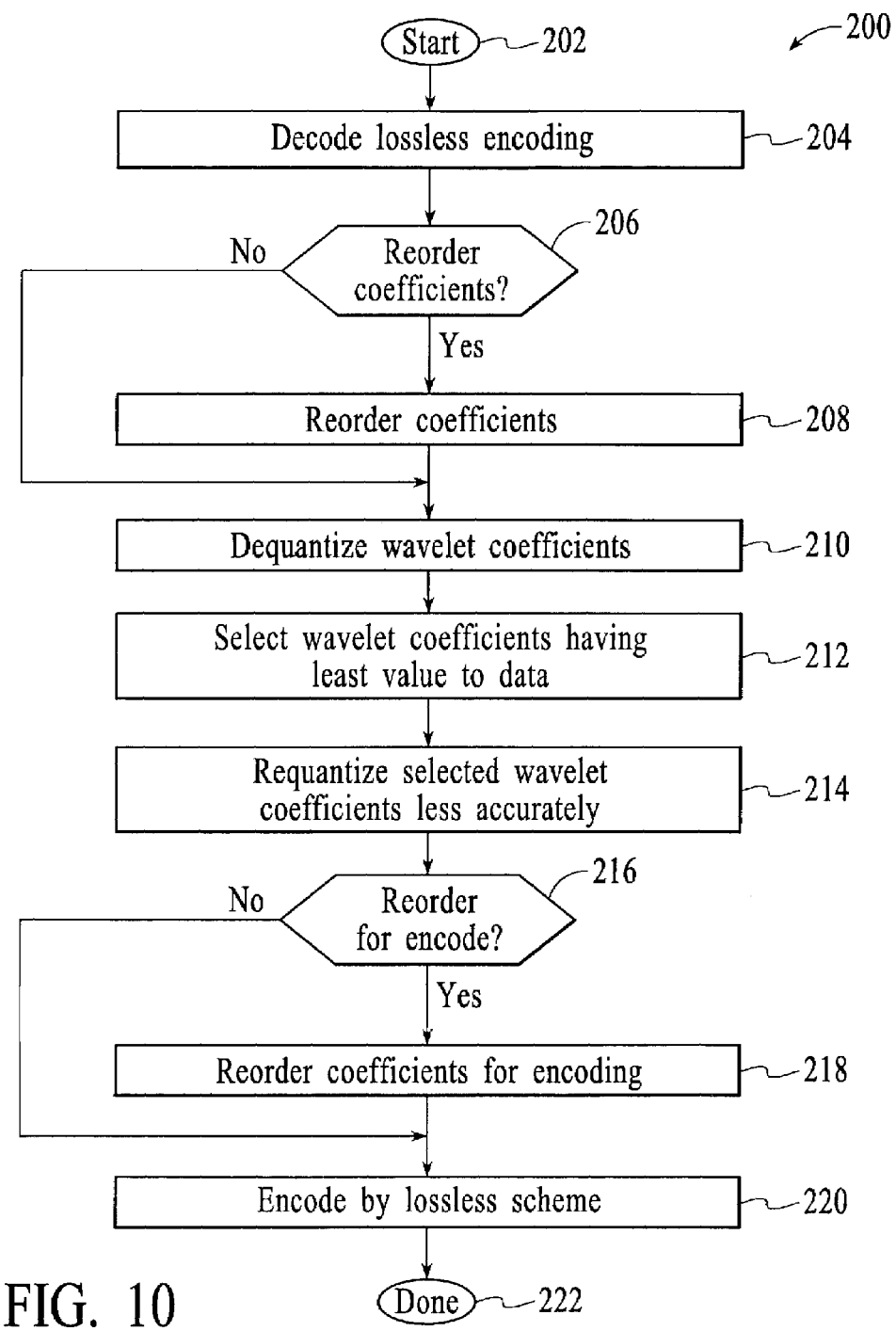
FIG. 10 is a flow diagram illustrating a method of the present invention for further compressing wavelet-compressed data using requantization.

FIG. 10 is a flow diagram illustrating another method 200 of further compressing wavelet-compressed data. This method performs dequantization and requantization of the wavelet coefficients. This can be used when a fast, real-time response is not a relevant consideration.

The method begins at 202, and in step 204, the lossless coded data is decoded, if necessary, i.e. this step is performed if the lossless coding in the original compression process of FIG. 3 caused the wavelet coefficients, or blocks thereof, to not be separable in the compressed data. If the coefficients are readily distinguished in the compressed data, then step 204 is not necessary. In next step 206, the process checks if the wavelet coefficients are to be reordered into wavelet transform block order, similarly to the process of FIG. 8. If so, step 208 reorders the coefficients. In step 210, all of the wavelet coefficients in the compressed data are dequantized according to any well known method.

In step 212, particular wavelet quadrant blocks and/or groups of coefficients in blocks are selected which have the least value. The particular blocks or groups that are selected can be based on user criteria, similar as described for embodiments above; these selected coefficients are to be compressed further and thus will have more loss. For example, in a preferred embodiment, those blocks and/or groups are selected which have the least information and/or the least impact on the visual quality of the image so that the loss in data is not as noticeable in the image.

In step 214, all the coefficients are requantized, where the selected coefficients are requantized less accurately than they were quantized after the original wavelet transform (see FIG. 3), i.e. the coefficients are requantized as to cause more data loss for the selected quadrant blocks and/or groups of coefficients. In general, the less accurate the quantization, the less space the quadrant requires for storage. Since the selected blocks and/or groups have the least impact on visual quality, a less accurate requantization has minimal impact on visual quality of the image. In some embodiments, to achieve greater compression ratios, the blocks or groups that were previously quantized accurately to maintain visual quality can additionally be requantized less accurately.

In step 216, the requantized wavelet coefficients checked for reordering, and in step 218 are reordered in the form provided before the reordering step 208, if necessary. The coefficients are recoded (recompressed) in the lossless encoding in next step 220. The process is then complete at 222.

Figure 11:
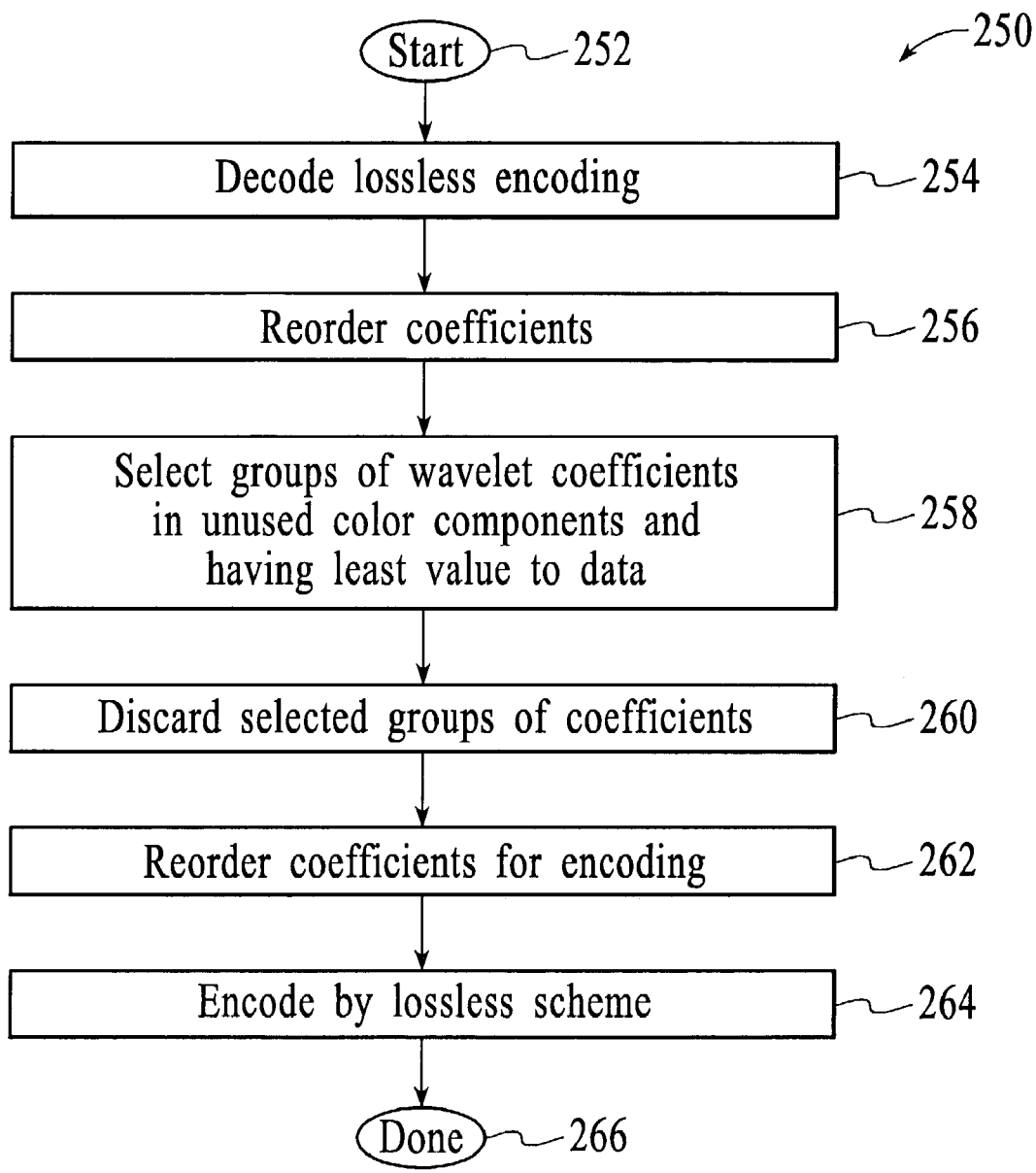
FIG. 11 is a flow diagram illustrating a method of the present invention for further compressing image data based on color information in the compressed data.

FIG. 11 is a flow diagram 250 illustrating another method of the present invention in which color information can be the basis for image compression for archival. Color information may not be very useful for an archived image in some archival applications, e.g. it may be sufficient to store images as monochrome or black and white, in which case this method can be useful.

The method begins at 252, and in step 254, the lossless coded data is decoded, if necessary (if the coefficients are readily distinguished in the compressed data, then step 254 is not necessary). In next step 256, the wavelet coefficients are reordered into wavelet transform block order for each color component (an example of which is shown above in FIG. 4). In step 258, groups of wavelet coefficients in color components are selected. Those color components not required in the final archived image are discarded. For example, if only luminance information is required in the final archived image, then the Cb and Cr components of the transformed image are not required. This would result in an image with a Y component only. Since the Y component contains the luminance information for the image, the information archived may be useful for a range of purposes, thereby saving valuable storage space. Furthermore, in this step 258, transform blocks and/or groups of coefficients in transform blocks that have the least value to the image, such as having the least actual information and/or the least significant impact on the final image quality, can also be selected, similar to such steps in processes described above. In step 260, the selected transform blocks and/or groups of coefficients are discarded by zeroing the coefficients. In step 262, the wavelet coefficients are reordered, and in step 264, the coefficients are compressed through the lossless encoder. The process is then complete at 266.

In another application of the present invention, the Y, Cr, and Cb components of wavelet transformed and quantized coefficients can be selected so as to not lose the original color balance of the original. In such circumstances, this technique preserves a sufficient number of quarters for each color component of wavelet transformed and quantized coefficients so as to preserve the color information and balance to the maximum possible extent. Quarters that are not needed to preserve the color balance can be discarded to achieve the higher compression ratio.

This same type of process can be applied in other applications, in which one or more features in an image is desired to be preserved. In the example above it is color balance, but in other applications it can be other features. For example, maximum edge information in the image may need to be preserved. Coefficients and/or blocks (such as the HH or HV blocks of Y component) which preserve edge information can therefore be preserved when discarding coefficients in the present invention.

Any of the above techniques and systems can be used to archive data when receiving the data over a computer network, e.g. using one of many well-known network protocols facilitating communication between computer devices. Any local network or wide area network (e.g., the Internet) can be used. The network node can archive the data upon reception at the node. Data to be archived can be supplied in its raw form, or already compressed. A number of other methods can also be used to archive data over a network. One method of archiving can be to discard some already-compressed elements of the incoming data stream, as in any of the above methods.

It should be noted that the above-described techniques can be combined in various ways where appropriate to achieve greater image quality, less data loss, greater or less compression, and/or other desired characteristics. Furthermore, the techniques and systems described above can each be adjusted by the user to achieve the desired compression ratio and accuracy thereof, archival speed, and data quality.

Although the present invention has been described in accordance with the embodiments shown, one of ordinary skill in the art will readily recognize that there could be variations to the embodiments and those variations would be within the spirit and scope of the present invention. For example, although the present invention is described in the context of a frame being divided into four quadrants, or quarters, one of ordinary skill in the art recognizes that a frame could be divided into any number of sections and still be within the spirit and scope of the present invention. Furthermore, the techniques of the present invention can be applied to other types of data besides image data, including video data, audio data, or other types of data. Accordingly, many modifications may be made by one of ordinary skill in the art without departing from the spirit and scope of the appended claims.

What is claimed is:

1. A method for archiving compressed data, the method comprising:
    receiving the compressed data, the compressed data having previously been transformed and compressed, and wherein the compressed data has been previously decomposed and compressed with a transformation technique and then compressed using at least one lossless compression scheme after the transformation technique;
    decoding the lossless compression scheme of the compressed data before selecting wavelet coefficients in the compressed data;
    selecting the wavelet coefficients in the compressed data for discarding;
    discarding the selected coefficients to reduce the amount of storage space required by the compressed data; and
    re-encoding the compressed data with the lossless compression scheme after the selected wavelet coefficients have been discarded.

2. The method of claim 1 wherein the compressed data was previously transformed and compressed using a wavelet transform.

3. The method of claim 1 wherein the transformation technique is a wavelet transformation, and further comprising reordering the wavelet coefficients in the compressed data into wavelet transform quadrants after the decoding of the lossless compression scheme, and reordering the wavelet coefficients for re-encoding after the selected wavelet coefficients have been discarded.

4. The method of claim 1 wherein the at least one lossless compression scheme includes a first lossless compression scheme, Huffman encoding, followed by a second lossless compression scheme, Run Length encoding.

5. The method of claim 1 wherein the compressed data is received over a computer network.

6. A method for archiving compressed data, the method comprising:
    receiving the compressed data, the compressed data having previously been sub-sampled by a wavelet transform, wherein the compressed data has been previously compressed using a lossless compression scheme after the sub-sampling by the wavelet transform;
    decoding the lossless compression scheme of the compressed data before selecting wavelet coefficients in the compressed data;
    selecting the wavelet coefficients in the compressed data for discarding;
    discarding the selected wavelet coefficients to reduce the amount of storage space required by the compressed data; and
    re-encoding the compressed data with the lossless compression scheme after the selected wavelet coefficients have been discarded.

7. The method of claim 6 further comprising reordering the wavelet coefficients in the compressed data into wavelet transform quadrants after the decoding of the lossless compression scheme.

8. The method of claim 7 further comprising reordering the wavelet coefficients for re-encoding after the selected wavelet coefficients have been discarded.

9. The method of claim 6 wherein the selecting of wavelet coefficients includes selecting wavelet transform blocks and wherein the discarding includes discarding the selected wavelet transform blocks.

10. The method of claim 6 wherein the selecting of wavelet coefficients includes selecting groups of wavelet coefficients within wavelet transform blocks and wherein the discarding includes discarding the selected groups of wavelet coefficients.

11. The method of claim 6 wherein the selecting of wavelet coefficients is based at least in part on a signal to noise ratio of wavelet quarters in the compressed data.

12. A system for archiving compressed data, the system comprising:
    a decoder that decodes the compressed data from a lossless compression scheme, wherein the compressed data has previously been transformed by a wavelet transformation and compressed by the lossless compression scheme;

a first reordering mechanism that reorders the wavelet coefficients in the compressed data into wavelet transform quadrants after the decoding of the lossless compression scheme;

a selector and discarder that select coefficents in the compressed data and discards the selected coefficients to provide secondary compressed data that has reduced storage space requirements;

a coder that secondary compressed data in the lossless compression scheme; and a second recording mechaamism that reorders the wavelet coefficients for re-encoding after the selected wavelet coefficients have been discarded.

13. A computer readable medium including program instructions for archiving compressed data, the program instructions perfonning the steps comprising:

receiving the compressed data, the compressed data having previously been transformed and compressed, wherein the compressed data has been previously decomposed and compressed with a transformation technique and then compressed using a lossless compression scheme after the transformation technique;

decoding the lossless compression scheme of the compressed data before selecting wavelet coefficients in the compressed data;

selecting the wavelet coefficients in the compressed data for discarding;

discarding the selected coefficients to reduce the amount of storage space required by the compressed data; and re-encoding the compressed data with the lossless compression scheme after the selected wavelet coefficients have been discarded.

14. The computer readable medium of claim 13 wherein the compressed data was previously transformed and compressed using a wavelet transform.

15. The computer readable medium of claim 13 wherein the compressed data was transformed with a wavelet transformation, and further comprising reordering the wavelet coefficients in the compressed data into wavelet transform quadrants after the decoding of the lossless compression scheme, and reordering the wavelet coefficients for re-encoding after the selected wavelet coefficients have been discarded.

* * * * *